Feb. 19, 1957 G. A. FEDDE 2,782,252

PHASE ERROR CORRECTION APPARATUS FOR
COLOR TELEVISION INDEXING SYSTEM
Filed Feb. 18, 1953

INVENTOR.
GEORGE A. FEDDE
BY
Oscar V. Hazeltine
ATTORNEY

United States Patent Office 2,782,252
Patented Feb. 19, 1957

2,782,252

PHASE ERROR CORRECTION APPARATUS FOR COLOR TELEVISION INDEXING SYSTEM

George A. Fedde, Philadelphia, Pa., assignor to Philco Corporation, Philadelphia, Pa., a corporation of Pennsylvania Application February 18, 1953, Serial No. 337,538

16 Claims. (Cl. 178—5.4)

Figures 1, 2:
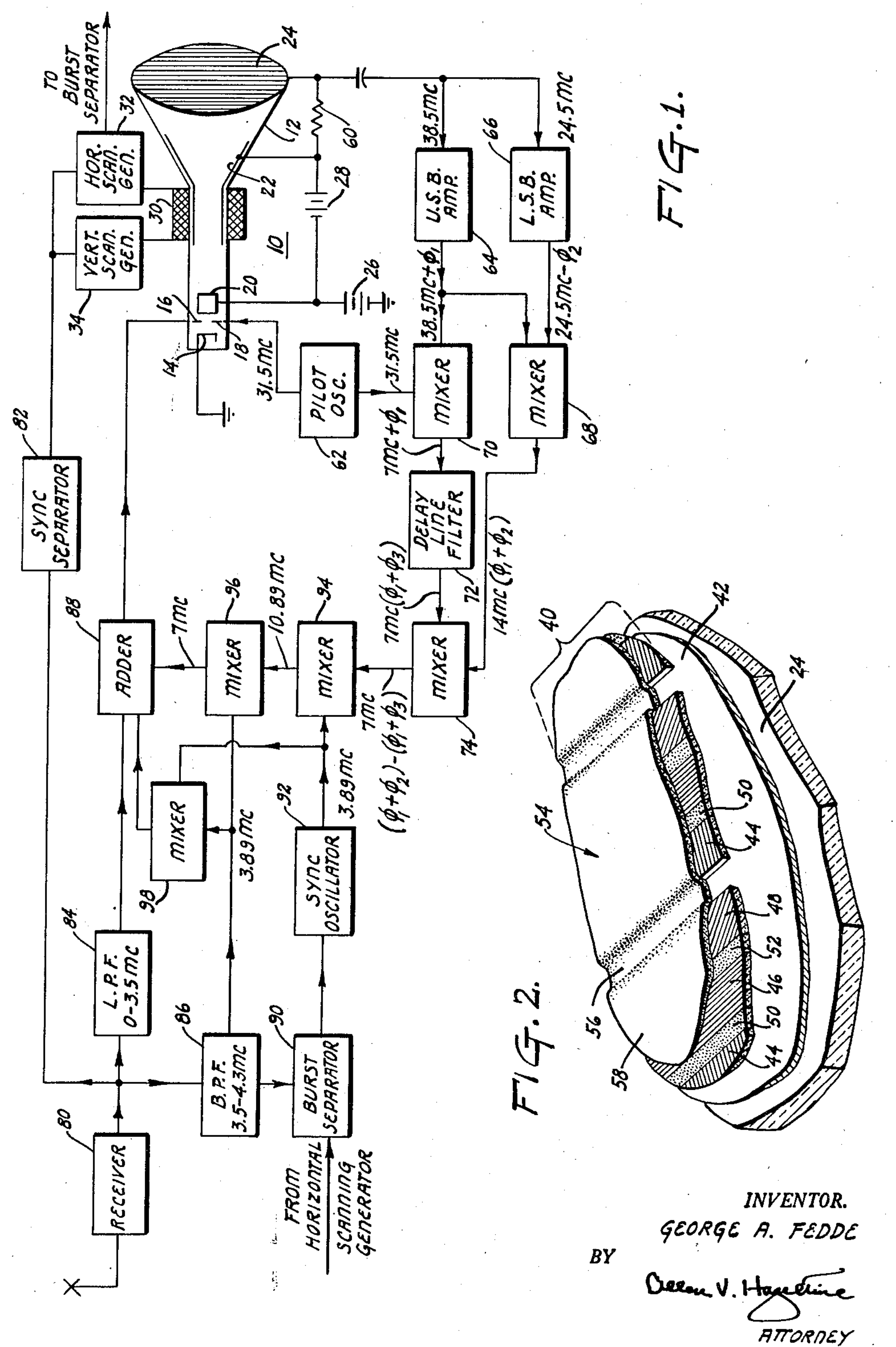

The present invention relates to electrical systems and more particularly to cathode-ray tube systems comprising a beam intercepting structure and indexing means arranged in cooperative relationship with the beam intercepting structure and adapted to produce a signal indicative of the position of the cathode-ray beam.

The invention is particularly adapted for, and will be described in connection with, a color television image presentation system utilizing a single cathode-ray tube having a beam intercepting, image forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normal horizontally-scanning cathode-ray beam produces red, green and blue light successively. From a color television receiver there may then be supplied a video signal wave having signal components definitive of the brightness and chromaticity of the image to be reproduced, which wave is utilized to control the intensity of the cathode-ray beam to the required instantaneous value as the beam scans the phosphor stripes.

The video color wave may be generated at the transmitter by means of appropriate camera units producing three signals indicative of three color-specifying parameters of successively scanned elements of a televised scene. These three signals are preferably such as to specify the color of the image elements with respect to three imaginary color primaries "X," "Y" and "Z" as defined by the International Commission on Illumination (ICI). With this choice of primaries, the Y signal represents the brightness of the image elements as perceived by the human eye, while the X and Z signals contain the remaining intelligence as to the color of the image elements. Since the specification of any color in terms of any given set of primaries may be converted to a specification of the same color in terms of any other set of primaries by means of linear transformations, the transmission of the X, Y and Z signals makes available at the receiver all of the required information necessary to excite the three real primary-color sources of the image reproducing cathode-ray tube.

In a preferred arrangement for segregating and apportioning the intelligence concerning the X, Y and Z components of the color of the image elements at the transmitter, these components are combined to form two difference signals (X–Y) and (Z–Y) which are transmitted in different phase relations as amplitude-modulation of a subcarrier signal. The Y signal is then transmitted in the frequency band located below that of the modulated subcarrier. The modulation of the subcarrier is preferably effected by means of balanced modulators, so that no subcarrier signal is generated when the difference signals (X–Y) and (Z–Y) are zero, i. e. when image elements which are white or gray are scanned. However, when colored image elements are scanned, either or both of the difference signals (X–Y) and (Z–Y) will differ from zero, producing a subcarrier signal having a phase determined by the relative values of the difference signals and hence by the hue of the image, and an amplitude determined by the absolute values of the difference signals and hence by the saturation of the image color. The modulated subcarrier signal therefore may be considered a chromaticity signal having a phase and amplitude representative of the hue and saturation respectively, of the color of the image elements.

The instantaneous amplitude of the video signal will be a function of the magnitudes of the three components thereof and of the absolute phase positions of the two components constituting the modulated subcarrier signal, and at any given instant the amplitude is indicative of the intensity of one of the primary color constituents of an element of the image to be reproduced. For proper color rendition, it is required that, as the phosphor stripe producing a given one of the primary colors of light of a particular image element is impinged by the cathode-ray beam, the intensity of the beam be simultaneously controlled in response to the contemporaneous value of the video signal representing the corresponding color component of the televised image element. Such a synchronous relationship may be maintained throughout the scanning cycle by deriving indexing signals indicative of the instantaneous position of the cathode-ray beam upon the image-forming screen, and by utilizing these signals to control the relationship between the phase of the video wave and the position of the beam. The said indexing signal may be derived from a plurality of beam responsive signal generating regions of the beam intercepting screen structure, which regions are arranged in a geometric configuration indicative of the geometric configuration of the phosphor stripes so that, when the beam scans the screen, the indexing regions are excited in spaced time sequence relative to the scanning of the color triplets and the desired indexing signal is generated in a suitable output electrode system of the cathode-ray tube. The indexing regions may be constituted by a layer of a material adapted to exhibit secondary electron emissive properties as specified stripe portions thereof different from the secondary emissive properties at other portions thereof. Such differences in secondary electron emissivities may be attained by an underlying layer exhibiting, at corresponding portions, different values of resistance to electron flow, as disclosed and claimed in the copending application of William E. Bradley and Meier Sadowsky, Serial No. 313,018, filed October 3, 1952. In another form, the indexing regions may be in the form of stripes of a material having secondary-emissive properties which differ from the secondary-emissive properties of the remaining portions of the beam intercepting structure. For example, such indexing portions may consist of stripes of a high atomic number material such as gold, platinum or tungsten or may consist of certain oxides such as cesium oxide or magnesium oxide. Alternatively, the indexing regions may consist of stripes of a fluorescent material, such as zinc oxide, having a spectral output in the non-visible light region and the indexing signals may be derived from a suitable photoelectric cell arranged, for example, in a side wall portion of the cathode-ray tube out of the path of the cathode-ray beam and facing the beam intercepting surface of the screen structure.

To achieve a desired degree of definition comparable to that commonly available in so-called black-and-white image reproducers, the image reproducing screen of the cathode-ray tube should contain a relatively large number of groups of phosphor stripes. In the case of a cathode-ray tube screen constituted by vertically arranged color triplets, the number of triplets should correspond to the number of picture elements contained in one line scan of the reproduced image and in a typical case there may be approximately 400 to 450 color triplets arranged on the screen surface of the cathode-ray tube.

As a general rule, the rate at which the beam scans the phosphor stripes and the associated indexing portions can be maintained constant only within certain tolerance values. This is due to the fact that the phosphor stripes and the indexing portions are normally arranged on the screen surface with only a certain degree of precision dictated by economic considerations and manufacturing tolerances so that a non-uniform distribution of these components on the screen surface can normally be expected. Furthermore, and as a practical matter, it is not feasible to exactly correlate the waveform of the signal energizing the deflection system of the cathode-ray tube with the geometry of the image screen, so that non-uniformities of the scanning rate can additionally be expected from this source.

The departures from constant velocity, as the beam scans the screen structure, produce corresponding changes in the frequency of the indexing signal produced by the screen structure.

In the copending application of E. M. Creamer, Jr., et al., Serial No. 240,324, filed August 4, 1951, there have been described systems by means of which the desired indexing information can be obtained from the screen structure in a readily usable form. More particularly, and in accordance with the principles set forth in the said copending application, use is made of the finding that the scanning of the indexing regions by the electron beam produces, in the collector circuit of the cathode-ray tube, signal components which represent modulation products as determined by the intensity variations of the beam and the rate of scanning the indexing regions. Accordingly, by additionally varying the intensity of the beam at a pilot carrier rate widely different from the rate at which the beam intensity is varied by the video signal, an output signal is produced in the collector electrode of the cathode-ray tube comprising, as one component, modulation products proportional to the pilot carrier frequency and the rate of scanning the indexing regions. Because the frequencies of these modulation products are widely different from the frequencies of any modulation products brought about by the video signal variations of the beam, the former may be separated from the latter by suitable frequency discriminating means. These pilot carrier modulation products consist essentially of a carrier wave at the pilot carrier frequency and sideband signals representing the sum and difference of the pilot carrier frequency and the rate of scanning the indexing regions. Since changes in the rate of scanning the indexing regions will be indicated by a change in the frequencies of the sideband signals, either or both of the sideband signals may be used as a source of the desired indexing information.

The desired sideband signal must be separated from undesirable signal components also generated at the screen structure by the scanning beam, and must be appropriately amplified to make it suitable for controlling the phase of the video signal applied to the beam intensity controlling system in the desired synchronous relationship to the position of the scanning beam. The selector circuits commonly available for this purpose generally apply to the selected signal a phase shift which varies as a function of the frequency thereof, so that the processed indexing information may no longer have the same form as the generated indexing information for all frequency values of the generated signal.

In some instances, these undesired phase variations of the processed indexing signal may be sufficient to produce a serious error of color synchronization between the position of the beam and the contemporaneous value of the color video signal applied to the intensity control system of the cathode-ray tube.

It is an object of the invention to provide improved cathode-ray tube systems of the type in which the position of an electron beam on a beam intercepting screen structure is indicated by an indexing signal derived from an indexing component of the screen structure.

Another object of the invention is to provide improved cathode-ray tube systems in which undesired phase variations of the indexing signal normally produced in processing the indexing signal are obviated.

A further object of the invention is to provide an improved index signal producing system for cathode-ray tubes, in which system phase variations of the indexing signal normally produced in the processing of the indexing signal may be compensated to any desired degree.

Another object of the invention is to provide a color television cathode-ray image reproducing system in which accurate color rendition is achieved notwithstanding non-uniformities of the distribution and of the scanning of the color reproducng elements of the image screen of the cathode-ray tube.

Further objects of the invention will appear as the specification progresses.

In accordance with the invention, in a cathode-ray tube system adapted to generate an indexing signal comprising modulation products which are determined by the frequency of a pilot carrier signal varying the intensity of the cathode-ray beam and by the rate of scanning indexing regions of the beam intercepting structure, and which are indicative of the position of the beam, the foregoing objects are achieved by means of an indexing system in which the upper and lower sideband components are selectively derived from the indexing signal generated in the manner above described and subjected to the normal phase variations produced by the selecting system. The two sideband components are then combined in a first channel in a heterodyne mixing system to produce a first signal having a frequency equal to the algebraic sum of the frequencies of the sideband components and having phase variations equal to the sum of the phase variations of the selected sideband components. In addition one of the sideband components is processed in a second channel adapted to impart predetermined phase variations to the sideband component thereby to produce a second signal having phase variations accentuated by the additional phase variations supplied by the second channel. The two signals so produced are thereafter combined in a heterodyne mixing system to produce an output signal having a frequency equal to the difference between the frequencies of the two signals and phase variations equal to the difference between the phase variations of the two signals. By appropriately adjusting the phase variations additionally supplied by the second channel, the difference phase variations of the output signal may be made to approach zero or may be made to have a sign and amount sufficient to compensate for phase variations of the indexing information applied thereto by subsequent components of the indexing signal circuit.

More specifically and in accordance with one embodiment of the invention, the first order upper and lower sidebands of the generated indexing signal are preferentially selected from the signal generated by the indexing structure of the cathode-ray tube by selective amplifiers which impart first and second phase variations respectively to the selected sideband signals. The so selected sidebands are supplied to a first mixer system which produces a first heterodyne signal having a nominal frequency equal to the difference between the nominal frequencies of the sidebands and having phase variations equal to the sum of the phase variations imparted to the sidebands by the selecting means. Additionally, the selected upper sideband is combined with a signal at the carrier frequency to produce a second heterodyne difference frequency signal having a nominal frequency equal to the nominal rate of scanning the indexing regions of the image screen and having the phase variations characterizing the upper sideband signal. This second heterodyne signal is subjected to additional phase variations of predetermined magnitude and thereafter combined with the said first heterodyne signal to produce an output heterodyne difference frequency signal having a nominal frequency equal to the nominal rate of scanning the indexing regions and having phase variations equal to the difference between the phase variations of the first heterodyne signal and the phase variations of the delayed second heterodyne signal. By appropriately selecting the phase variations imparted to the heterodyned upper sideband signal, the phase variations of the output signal can be made to equal zero or can be made of such sign and magnitude so as to compensate phase variations imparted to the indexing information in the subsequent processing thereof.

The invention will be described in greater detail with reference to the appended drawing forming part of the specification and in which:

Figure 1 is a block diagram, partly schematic, showing one embodiment of a cathode-ray tube system in accordance with the invention; and Figure 2 is a perspective view of a portion of one form of an image reproducing screen structure suitable for the cathode-ray tube systems of the invention.

Referring to Figure 1, the cathode-ray tube system there shown comprises a cathode-ray tube 10 containing, within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope and terminates at a point spaced from the end face 24 of the tube in conformity with well established practice. Suitable forms of construction for the dual beam generating system have been described in the copending application of Melvin E. Partin, Serial No. 242,264, filed August 17, 1951, and a further description thereof herein is believed to be unnecessary. Electrodes 20 and 22 are maintained at their desired operating potentials by suitable voltage sources shown as batteries 26 and 28, the battery 26 having its positive pole connected to the anode 20 and its negative pole connected to a point at ground potential, and the battery 28 being connected with its positive pole to electrode 22 and its negative pole to the positive pole of battery 26.

A deflection yoke 30 coupled to horizontal and vertical deflection signal generators 32 and 34 respectively, of conventional design, is provided for deflecting the dual electron beams across the faceplate 24 of the tube to form a raster thereon.

The end faceplate 24 of the tube 10 is provided with a beam intercepting structure 40, one suitable form of which is shown in Figure 2. In the arrangement shown in Figure 2, the structure 40 is formed directly on the faceplate 24. However, it should be well understood that the structure 40 may be formed on a suitable light transparent base which is independent of the faceplate 24 and may be spaced therefrom. The faceplate 24 is provided with a light transparent electrically conductive coating 42, which may be a coating of stannic oxide or of a metal such as silver, having a thickness only sufficient to achieve the desired conductivity. Superimposed on the coating 42 are a plurality of parallelly arranged stripes 44, 46 and 48 of phosphor materials which, upon impingement of the cathode-ray beam, fluoresce to produce light of three different primary colors. For example, the stripe 44 may consist of a phosphor such as zinc phosphate containing manganese as an activator, which upon electron impingement produces red light, the stripe 46 may consist of a phosphor such as zinc orthosilicate, which produces green light, and the stripe 48 may consist of a phosphor such as calcium magnesium silicate containing titanium as an activator, which produces blue light. Other suitable materials which may be used to form the phosphor stripes 44, 46 and 48 are well known to those skilled in the art, as well as methods of applying the same to the faceplate 24, and further details concerning the same are believed to be unnecessary.

Each of the groups of stripes may be termed a color triplet, and the sequence of the stripes is repeated in consecutive order over the area of the structure 40.

The desired indexing signal is generated in the manner described and claimed in the above mentioned copending application of William E. Bradley and Meier Sadowsky. More particularly, and in accordance with one arrangement described in said copending application, the phosphor stripes 44, 46 and 48 are arranged in spaced relationship as shown in Figure 2 and the spacing between stripes 44–46 and between 46–48 are filled with an electrically insulating material such as unactivated willemite, the said stripes so formed being shown as 50 and 52 respectively. Arranged over the stripes 44, 46, 48, 50 and 52, and in contact with the coating 42 at the spaces between the stripes 44 and 48, is a coating 54 of a material adapted to exhibit different secondary emissive properties as determined by the resistance to electron flow of the underlying layer. Such a material may be magnesium oxide, which, in the construction shown, exhibits, at its portions 56 in contact with the conductive layer 42, a secondary electron emissivity different from that exhibited by its portions 58 overlying the stripes 46, 48, 50 and 52.

The beam intercepting structure so constituted is connected to the positive pole of battery 28 through a load impedance 60 (see Figure 1) by means of a suitable connection to the conductive coating 42 thereof.

Since the dual cathode-ray beams are deflected by the common deflection yoke 30, they simultaneously scan the beam intercepting structure 40, and indexing information derived from one of the beams may be used to establish the position of the other beam. When, in accordance with the principles set forth in the above-mentioned application of E. M. Creamer, Jr., et. al., one of the beams, such as the beam under the control of the electrode 18, is varied in intensity at a pilot frequency, for example by means of a pilot oscillator 62, the so varied beam will generate across the load resistor 60 an indexing signal comprising a carrier component at the pilot frequency and sideband components representing the sum and difference frequencies of the pilot frequency and the rate at which the indexing stripe regions 56 are scanned by the beam.

In a typical case, the pilot frequency variations of the intensity of the beam may occur at a nominal frequency of 31.5 mc./sec. and, when the rate of scanning the indexing regions 56 of the coating 54 (see Figure 2) is nominally 7 million per second as determined by the horizontal scanning rate and the number of indexing regions 56 impinged per scanning period, a modulated signal at a nominal frequency of 31.5 mc./sec. and having first order sideband components nominally at 24.5 mc./sec. and 38.5 mc./sec. is produced across the load resistor 52. Changes in the rate of scanning the indexing regions, due to non-linearities of the beam deflection and/or non-uniformities of the spacing of the indexing regions, produce corresponding changes in the frequencies of the sideband components about their respective nominal values so that the sidebands may be used as the source of the desired indexing information. These sideband components are preferentially selected from the other components generated across load impedance 60 by means of an amplifier 64 having a restricted pass band characteristic centered about the nominal frequency of the upper sideband and an amplifier 66 having a restricted pass band characteristic centered about the nominal frequency of the lower sideband.

Because of the relatively narrow bandwidth of the amplifiers 64 and 66, the signals processed thereby are subjected to phase variations $\phi_1$ and $\phi_2$ respectively, the extent of which are determined by the phase versus frequency characteristics of the amplifiers and by the extent of the frequency deviations of the processed signal. In some instances, these phase variations imparted to the selected upper and lower sideband components may be sufficient to produce a serious error of color synchronization between the position of the beam on the screen structure and the contemporaneous value of the color video signal applied to the intensity control system of the cathode-ray tube.

In accordance with the embodiment of the invention shown in Figure 1, these undesirable phase variations are compensated by a frequency heterodyne system comprising a first channel in which the upper and lower sidebands are combined to produce a first heterodyne signal having a nominal frequency equal to the difference between the nominal frequencies of the upper and lower sideband components and having phase variations equal to the sum of the phase variations imparted to the upper and lower sidebands. The system further comprises a second channel in which the upper sideband is combined with the pilot carrier signal to produce a second heterodyne signal having a nominal frequency equal to the difference between the frequency of the upper sideband and the pilot carrier and having the phase variations of the upper sideband signal. This latter heterodyne signal is subjected to additional phase variations of controlled amount and is thereafter combined with the first heterodyne signal to produce an output heterodyne signal having phase variations equal to the difference between the phase variations of the first and second heterodyne signals.

More specifically, the system shown in Figure 1 comprises a first mixer 68 to which the upper sideband signal from amplifier 64 and the lower sideband signal from amplifier 66 are supplied. The mixer 68 produces an output difference frequency signal which, for the specific frequency values above given, has a nominal frequency of 14 mc./sec. and exhibits phase variations $\phi_1+\phi_2$ representing the sum of the phase variations of the two input signals. The output of amplifier 64 is further supplied to a mixer 70, together with a signal from the pilot oscillator 62, to produce a second heterodyne signal at a nominal frequency of 7 mc./sec. having the phase variations $\phi_1$ of the signal from amplifier 64. By means of a delay line filter system 72 this latter signal is subjected to phase variations $\phi_3$ so that a signal at 7 mc./sec. having phase variations $\phi_1+\phi_3$ is produced. The 14 mc./sec. signal at the output of mixer 68, and the 7 mc./sec. signal at the output of delay line filter system 72, are combined in a mixer 74 to produce a heterodyne difference frequency signal having a nominal frequency of 7 mc./sec. and having phase variations $(\phi_1+\phi_2)-(\phi_1+\phi_3)$. By adjusting the phase variations $\phi_3$ to be equal to the phase variations $\phi_2$ the phase variations of the signal at the output of mixer 74 are effectively cancelled. It is evident that the phase variations $\phi_3$ may be made greater than the phase variations $\phi_2$, in which case it is possible to overcompensate the system, as would be desirable in the event that the output signal of mixer 74 is to be subjected to additional phase variations in the subsequent processing thereof.

The heterodyne mixers 68, 70 and 74 may be of conventional form and may each consist, for example, of a dual grid thermionic tube, to the different grids of which the two output signals are supplied. Each of the mixers may contain an output circuit broadly tuned to the frequency of the desired output signal, whereby the desired heterodyne frequency signal may be preferentially selected.

The design of the delay line filter 72 may conform to standard practice and, in a typical case, the filter may consist of a multiple tuned circuit having an overall resonant frequency of which is equal to the nominal frequency of the signal applied thereto and having a pass band sufficient to transmit all frequency values of the applied input signal. In those instances in which the phase shift $\phi_3$ to be produced is equal to the phase shift $\phi_2$ produced by the amplifier 66, the filter 72 may be of construction similar to the bandwidth limiting filter embodied in the amplifier 66. When the desired phase shift $\phi_3$ is to be greater or smaller than the phase shift $\phi_2$, appropriate modifications to the characteristics of the filter 72 may be made in the manner well known to those skilled in the art.

The indexing information contained in the signal from mixer 74 may be used to establish the relative phase between the video wave and the position of the image generating beam of the tube 10 in any of several manners. In a typical arrangement, the indexing information may be combined with the video signal in a mixer system of the type shown in Figure 1. More particularly, for supplying a color video wave to the control grid 16 of cathode-ray tube 10, there is provided a receiver 80 which may be of conventional design and include the usual radio frequency amplifier, frequency conversion and detector stages for producing a color video signal.

In a typical form, the color video signal comprises time-spaced horizontal and vertical synchronizing pulses recurrent at the horizontal and vertical scanning frequencies, and the color video wave occurring in the intervals between the horizontal pulses. The incoming video signal may further include a marker signal for providing a phase reference for the color establishing component of the color video wave, such a marker signal being usually in the form of a burst of a small number of cycles of carrier signal having a frequency equal to the frequency of the chromaticity subcarrier component of the video wave and occurring during the so-called back porch interval of the horizontal scanning pulses.

The synchronizing pulses contained in the received video signal are selected by a sync signal separator 82 of conventional form and subsequently energize, in well known manner, the horizontal and vertical scanning generators 32 and 34.

The video color wave is separated into its two components by means of a low pass filter 84 and a bandpass filter 86, whereby, at the output of filter 84, there is derived the low frequency component of the video wave containing the brightness information of the image, and, at the output of the filter 86, there is derived the modulated subcarrier component of the video wave indicative of the chromaticity information of the image and the marker signal. The frequency pass bands of the filters 84 and 86 are selected in conformity with the standards of the transmission system and a typical value for the pass band of filter 84 is 0 to 3.5 mc./sec. and for the filter 86 is 3.5 to 4.3 mc./sec. when the subcarrier frequency of approximately 3.89 mc./sec. is used at the transmitter.

The brightness signal is supplied to the control grid 16 of the tube 10 through an adder 88 having a plurality of inputs and a common output and consisting, in a typical case, of a plurality of thermionic tubes, the input grid circuits of which are separately energized by the respective input signals applied to the adder and the output anode circuits of which are supplied through a common load impedance.

The marker signal is separated from the video wave by means of a gated path operated in synchronism with occurrence of the marker signal. For this purpose, there is provided a burst separator 90 consisting, for example, of a dual grid thermionic tube having one control grid which is coupled to the output of the bandpass filter 86 and a second control grid so negatively biased as normally to prevent conduction through the tube. The tube is made conductive at the proper instant, i. e., during the back porch interval of the horizontal synchronizing pulses, by means of a positive pulse which may be derived from the output of the horizontal scanning generator 32 in well known manner and which is applied to the said second control grid to override the normal blocking bias. The burst separator may also contain a filter for attenuating undesirable signals at the output thereof—i. e., the separator may contain a resonant circuit which is tuned to the frequency of the marker signal and which is connected to the anode of the tube.

The marker signal so provided is applied to an oscillator 92 which is adapted to generate a signal having a frequency and a phase position as established by the frequency and phase position of the marker signal applied to the input thereof. In a suitable form the oscillator 92 may be of the type described in the copending application of Joseph C. Tellier, Serial No. 197,551, filed November 25, 1950.

The output of oscillator 92 at the color subcarrier frequency of 3.89 mc./sec. is applied to a heterodyne mixer 94, together with the nominally 7 mc./sec. signal at the output of mixer 74, to produce a heterodyne signal at 10.89 mc./sec., which signal has the color phase information as established by the color phase marker signal of the video signal derived from the receiver 80 and has the indexing information as established by the sideband components of the indexing signal derived from the screen structure of the cathode-ray tube. This heterodyne signal is in turn applied to a heterodyne mixer 96, together with the color modulated subcarrier of the video wave as derived from the bandpass filter 86, to produce an output wave at the frequency at which the color triplets of the screen structure are scanned, i. e. at 7 mc./sec. It will be noted that this latter output wave exhibits phase and amplitude variations as determined by the phase and amplitude variations of the color modulated subcarrier derived from bandpass filter 86, and the absolute phase position of these variations are established by means of the color marker signal and are further established with reference to the scanning rate of the color triplets of the cathode-ray tube by the indexing information as derived from the mixer 74.

The output wave so generated is supplied as a second input to the adder 88 coupled to the control electrode 16 of the tube 10.

The mixers 94 and 96 may be similar in construction to the mixers 68 and 70 and may each contain an output circuit broadly tuned to the frequency of the output signal thereof.

When the information at the output of the low pass filter 84 and the chromaticity information appearing on the color subcarrier derived from bandpass filter 86 are in terms of the imaginary color primaries X, Y and Z, as takes place in the preferred receiving system above specifically described, it may be necessary to modify these signals to make them conform to the particular real primary colors, R, G and B characterizing the phosphor stripes utilized in the screen assembly 40 (see Figure 2) of the cathode-ray tube. This may be accomplished by synchronously detecting a signal having the color information at a particular phase and adding the detection products in proper relative amounts to the imaginary color primary signals in the adder 88. In Figure 1, the color subcarrier wave, as derived from bandpass filter 86, and a demodulating signal at the subcarrier frequency, as derived from the oscillator 92, are synchronously detected by a heterodyne mixer 98, and the detection products so produced are applied as an additional input to the adder 88 to achieve the desired modification of the color signals. The mixer 98, which may consist of a dual grid tube as in the case of the mixers previously described, may include a conventional phase shifter for either or both of the input signals thereof to vary the relative phases of the signals, and may further include an amplifier in the output circuit to establish the amplitude of the output signal at the proper value relative to the amplitudes of the signals supplied to the adder 88 from the low pass filter 84 and from the mixer 96. As will be apparent to those skilled in the art, the actual value of the phase shift and the amplification which takes place in the mixer 98 are determined by the particular primary colors produced by the cathode-ray tube 10, and these quantities may be readily calculated.

While the invention has been described with reference to the use of a cathode-ray tube having two individually controllable beams, it is apparent that the invention is equally applicable to cathode-ray tubes having a single beam, in which case all of the signals supplied to the image reproducing tube may be applied to the same control electrode to correspondingly simultaneously vary the intensity of the beam. Furthermore, while, in the form of the invention described, the indexing information is derived from a cathode-ray tube screen structure in which the periodicity of the indexing regions is equal to the periodicity of the phosphor stripe color triplets, the invention is equally applicable to cathode-ray tube systems in which the periodicity of the indexing regions has other values relative to the periodicity of the color triplets. For example, the periodicity of the indexing regions may be one-half the periodicity of the color triplets, in which case, desirably, the amplifiers 64 and 66 are constructed to select the second order upper and lower sideband components of the generated signal. It is also apparent that the indexing information appearing at the output of mixer 74 may be used for controlling the relationship between the phase of the video wave and the position of the beam in ways other than that specifically shown. For example, this indexing information could be used for varying the scanning rate of the beam i. e. by actuating a variable reactance element coupled to the wave-shape determining network of the horizontal scanning generator 32, in the manner disclosed in the copending application of Wilson P. Boothroyd, Serial No. 219,093, filed April 3, 1951. Similarly, while separate amplifiers 64 and 66 have been shown, it is evident that a single amplifier, having a bandpass characteristic adapted to selectively derive the desired sideband components, may be used.

While I have described my invention with reference to a specific embodiment and by means of specific examples, I do not wish to be limited thereto for obvious modifications will occur to those skilled in the art without departing from the spirit and scope of the invention.

What I claim is:

1. An electrical system comprising means for producing a first signal having a given nominal frequency value and having upper and lower sideband components which are subject to frequency variations of equal magnitudes and opposite senses about respective nominal frequency values, means for selectively deriving said sideband components from said first signal, said last-named means having phase characteristics which vary as a function of the frequency of signals applied thereto whereby said means impart to said sideband components phase variations as determined by the frequency variations thereof, means for combining said derived sideband components to produce a second signal having a nominal frequency value equal to the algebraic sum of the nominal frequency values of said derived sideband components and having phase variations substantially equal to the sum of the phase variations of said derived sideband components, means for deriving from one of said sideband components a third signal said means for deriving said third signal being coupled to said selective deriving means for one of said sideband components and being adapted to produce a signal having phase variations equal to the sum of the phase variations of said one derived sideband component and additional phase variations as determined by the frequency variations of said one sideband component, and means for combining said second and third signals to produce a resultant signal having a nominal frequency equal to the difference between the nominal frequencies of said second and third signals and having phase variations substantially equal to the difference between the phase variations of said second and third signals.

2. An electrical system as claimed in claim 1 wherein said additional phase variations imparted to said signal have a value substantially equal to the phase variations of the other of said derived sideband components.

3. An electrical system as claimed in claim 1 wherein said additional phase variations imparted to said signal have a value greater than the phase variations of the other of said derived sideband components.

4. An electrical system as claimed in claim 1 wherein said selective deriving means are adapted to selectively derive the first order upper and lower sideband components of said first signal.

5. An electrical system as claimed in claim 1 wherein said means for deriving said third signal comprises means for combining with said one derived sideband component a fourth signal having a frequency equal to the nominal frequency of said first signal thereby to produce a heterodyne signal having a nominal frequency equal to the difference between the nominal frequency of said one selected sideband component and the frequency of said fourth signal, and further comprises a transmission path adapted to produce phase variations as determined by the frequency variations of a signal applied thereto, and means for applying said heterodyne signal to said transmission path.

6. An electrical system comprising means for producing a first signal having a given nominal frequency value and having first order upper and lower sideband components which are subject to frequency variations of equal magnitudes and opposite senses about respective nominal frequency values, means for selectively deriving said sideband components from said first signal, said last-named means having phase characteristics which vary as a function of the frequency of signals applied thereto whereby said means impart to said sideband components phase variations as determined by the frequency variations thereof, means for combining said derived sideband components to produce a first heterodyne signal having a nominal frequency value equal to the difference between the nominal frequency values of said derived sideband components and having phase variations substantially equal to the sum of the phase variations of said derived sideband components, means for combining one of said derived sideband components and a second signal having a frequency equal to the nominal frequency of the said first signal to produce a second heterodyne signal having a nominal frequency equal to the difference between the nominal frequency of said one derived sideband component and the frequency of said second signal, said second heterodyne signal undergoing phase variations substantially equal to the phase variations of said one derived sideband component, a transmission path coupled to said last mentioned combining means and adapted to impart additional phase variations to said second heterodyne signal, and means for combining said first and second heterodyne signals to produce an output heterodyne signal having a nominal frequency equal to the difference between the nominal frequencies of said first and second heterodyne signals and having phase variations substantially equal to the difference between the phase variations of said first heterodyne signal and the total phase variations of said second heterodyne signal.

7. An electrical system as claimed in claim 6 wherein said means for producing said second heterodyne signal comprises means for combining the said second signal and the said upper sideband component, and wherein said transmission path is adapted to impart phase variations to said second heterodyne signal substantially equal to the phase variations of said derived lower sideband component.

8. A cathode-ray tube system comprising a cathode-ray tube having a member adapted to intercept electrically charged particles, means for generating electrically charged particles and for directing the same in beam formation towards said intercepting member and means for varying the flow of said particles from said generating means, said intercepting member having first portions thereof arranged in a given geometric configuration and having a first given response characteristic upon impingement by said charged particles, said member further having second portions thereof arranged in a second geometric configuration indicative of said first configuration and having a second given response characteristic upon impingement by said particles different from said first characteristic; means for scanning said charged particles in beam formation across said intercepting member at a given nominal rate thereby to energize said first and second portions; means for varying the flow of said charged particles at a given rate; means for deriving from said intercepting member a first signal having a carrier frequency determined by the said rate of varying the flow of said charged particles and having upper and lower sideband signal components, said sideband components having nominal frequency values determined by the nominal rate of scanning said second portions and having frequency variations determined by variations of the rate of scanning said second portions; means for selectively deriving an upper and a lower sideband component of said first signal, said last-named means having phase characteristics which vary as a function of the frequency of signals applied thereto whereby said means impart to said selected components phase variations as determined by the frequency variations of said selected components; means for combining said selected sideband components to produce a first heterodyne signal having a nominal frequency equal to the difference between the nominal frequencies of the selected components and having phase variations substantially equal to the sum of the phase variations of the selected components; means for deriving from one of said sideband components a second signal having phase variations as determined by the frequency variations of said last mentioned sideband component and having additional phase variations as determined by frequency variations of said second signal; and means for combining said second signal and said first heterodyne signal thereby to produce an output heterodyne signal having a nominal frequency equal to the difference between the nominal frequencies of said first heterodyne signal and said second signal and having phase variations substantially equal to the difference between the phase variations of said last mentioned combined signals.

9. A cathode-ray tube system as claimed in claim 8 wherein said means for deriving said second signal comprises means for combining said one sideband component and a signal having a frequency equal to the said rate of varying the flow of said charged particles to produce a second heterodyne signal having a nominal frequency equal to the nominal rate of scanning said second portions.

10. A cathode-ray tube system as claimed in claim 9 wherein said means for deriving said second signal further comprises a transmission path adapted to apply to said second heterodyne signal phase variations substantially equal to the phase variations of the other of said selected sideband components.

11. A cathode-ray tube system as claimed in claim 9 wherein said means for deriving said second signal further comprises a transmission path adapted to apply to said second heterodyne signal phase variations greater than the phase variations of the other of said selected sideband components.

12. A cathode-ray tube system as claimed in claim 9 wherein said selecting means are adapted to selectively derive the first order upper and lower sideband components of said first signal.

13. A cathode-ray tube system as claimed in claim 9 comprising means for further varying the flow of said charged particles in accordance with desired variations of the said response of said first portions, and means responsive to said output heterodyne signal for controlling the relationship between the said further variations of flow of the charged particles and the position of the beam of charged particles on the said intercepting member.

14. A cathode-ray tube system for reproducing a color television image as defined by a color video wave indicative of visual aspects of said image, said system comprising a cathode-ray tube having an electron beam intercepting member, means for generating electrons and for directing the same in beam formation towards said beam intercepting member and means for varying the flow of electrons from said generating means, said intercepting member comprising first portions each comprising a plurality of stripes of fluorescent material arranged in substantially parallel relationship, said stripes being adapted to produce light of different colors in response to electron impingement, and said member further comprising second portions spaced apart substantially parallel to said fluorescent stripes and having a response characteristic upon electron impingement different from the response characteristic of said first portions; means for scanning said electrons in beam formation across said beam intercepting member at a given nominal rate thereby to energize said first and second portions; means for applying said color video wave to said electron flow varying means thereby to produce variations of the response of said first portions; a source of a first signal coupled to said tube for varying the flow of electrons from said generating means at a first nominal frequency value; means for deriving from said intercepting member a second signal having a carrier frequency determined by the frequency of said first signal and having first order upper and lower sideband components, said sideband components each having a nominal frequency value as determined by the rate of scanning said second portions and undergoing frequency variations as determined by variations of the rate of scanning said second portions; frequency selective means energized by said second signal and adapted to selectively transmit said sideband components and attenuate other components of said second signal, said frequency selective means having phase characteristics which vary as a function of the frequency of signals applied thereto whereby said means impart to the said transmitted sideband components phase variations as determined by the frequency variations of the said transmitted components about their respective nominal frequency value; means for combining said transmitted sideband components to produce a first heterodyne signal having a nominal frequency value equal to twice the nominal rate of scanning said second portions and having phase variations substantially equal to the sum of the phase variations of said transmitted sideband components; means for combining one of said transmitted sideband components and said first signal to produce a second heterodyne signal having a nominal frequency equal to the nominal rate of scanning said second portions and having phase variations equal to the phase variations of said one transmitted sideband component; a transmission path coupled to said last mentioned combining means, said transmission path having a phase characteristic which varies as a function of the frequency of a signal applied thereto whereby said path imparts additional phase variations to said second heterodyne signal; and means for combining said first and second heterodyne signals to produce an output heterodyne signal having a nominal frequency equal to the nominal rate of scanning said second portions and having phase variations substantially equal to the difference between the phase variations of said first heterodyne signal and the total phase variations of said second signal.

15. A cathode-ray tube system as claimed in claim 14 further comprising means responsive to said output heterodyne signal for controlling the relationship between the phase of said color video wave and the position of said electron beam on said beam intercepting member and means for supplying said output heterodyne signal to said controlling means.

16. A cathode-ray tube system as claimed in claim 15 wherein said transmission path is adapted to impart to said second heterodyne signal phase variations substantially equal to the phase variations of the other of said transmitted sideband components.

No references cited.